United States Patent
Klamser et al.

(10) Patent No.: US 11,608,120 B2
(45) Date of Patent: Mar. 21, 2023

(54) SILL FRAME ARRANGEMENT AND A VEHICLE BODY ARRANGEMENT COMPRISING A SILL FRAME ARRANGEMENT OF THIS TYPE

(71) Applicant: Dr. Ing. h.c. F. Porsche Aktiengesellschaft, Stuttgart (DE)

(72) Inventors: Herbert Klamser, Korntal-Muenchingen (DE); Alexander Schuenemann, Fellbach (DE); Michael Wagner, Wiernsheim-Pinache (DE); Oliver Pfisterer, Aichwald (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 99 days.

(21) Appl. No.: 17/358,006

(22) Filed: Jun. 25, 2021

(65) Prior Publication Data
US 2022/0001935 A1 Jan. 6, 2022

(30) Foreign Application Priority Data
Jul. 1, 2020 (DE) ..................... 10 2020 117 317.2

(51) Int. Cl.
*B60J 7/00* (2006.01)
*B62D 25/20* (2006.01)
*B62D 21/15* (2006.01)

(52) U.S. Cl.
CPC ......... *B62D 25/2036* (2013.01); *B62D 21/15* (2013.01)

(58) Field of Classification Search
CPC ................ B62D 25/025; B62D 21/157; B62D 25/2036; Y02E 60/10; Y02E 10/50; A61P 3/10; B60K 1/04
See application file for complete search history.

(56) References Cited

U.S. PATENT DOCUMENTS

| | | | | |
|---|---|---|---|---|
| 3,622,195 A | * | 11/1971 | Lautenbach | B62D 25/025 296/35.1 |
| 10,220,882 B2 | * | 3/2019 | Ayukawa | B62D 21/157 |

(Continued)

FOREIGN PATENT DOCUMENTS

| | | |
|---|---|---|
| DE | 102015219922 A1 | 4/2016 |
| DE | 102017124018 A1 | 5/2018 |

(Continued)

*Primary Examiner* — Kiran B Patel
(74) *Attorney, Agent, or Firm* — Leydig, Voit & Mayer, Ltd.

(57) ABSTRACT

A sill frame arrangement for a vehicle body arrangement includes: a battery arrangement provided in a floor region of the vehicle body arrangement, which has at least one frame arrangement having frame longitudinal members and frame cross members which surround and support at least one battery module, the frame longitudinal members resting on sill elements of a sill arrangement, the sill arrangement including wall elements which form sill chambers. Over an entire height of the sill arrangement, only one wall element directed toward the frame arrangement is provided, at least one additional sill element being provided on each sill element, the sill element and the at least one additional sill element being integrally bonded and interlockingly connected to one another.

9 Claims, 3 Drawing Sheets

(56) References Cited

U.S. PATENT DOCUMENTS

| | | | |
|---|---|---|---|
| 2007/0063543 A1* | 3/2007 | Roccato | B62D 21/157 |
| | | | 296/187.08 |
| 2013/0088044 A1* | 4/2013 | Charbonneau | B62D 27/023 |
| | | | 296/187.12 |
| 2014/0284125 A1* | 9/2014 | Katayama | B60L 3/0046 |
| | | | 180/68.5 |
| 2016/0114699 A1* | 4/2016 | Hokazono | B60K 1/04 |
| | | | 180/68.5 |
| 2017/0001667 A1* | 1/2017 | Ashraf | B60K 1/00 |
| 2017/0021740 A1* | 1/2017 | Brendecke | H01M 10/613 |
| 2017/0174176 A1* | 6/2017 | Hillmann | B60R 22/1952 |
| 2020/0140021 A1* | 5/2020 | Grottke | B62D 25/025 |
| 2020/0377045 A1* | 12/2020 | Renegar | B62D 25/025 |
| 2020/0398898 A1* | 12/2020 | Yamazaki | B62D 27/023 |
| 2021/0339617 A1* | 11/2021 | Ohkuma | B62D 25/20 |
| 2022/0144063 A1* | 5/2022 | Tatsuwaki | B60L 50/66 |
| 2022/0144064 A1* | 5/2022 | Tatsuwaki | H01M 50/202 |
| 2022/0144065 A1* | 5/2022 | Tatsuwaki | B60L 50/66 |
| 2022/0144068 A1* | 5/2022 | Burja | B60L 58/26 |

FOREIGN PATENT DOCUMENTS

| | | |
|---|---|---|
| DE | 102018217649 A1 | 4/2020 |
| DE | 102018127375 A1 | 5/2020 |

* cited by examiner

SILL FRAME ARRANGEMENT AND A VEHICLE BODY ARRANGEMENT COMPRISING A SILL FRAME ARRANGEMENT OF THIS TYPE

CROSS-REFERENCE TO PRIOR APPLICATION

Priority is claimed to German Patent Application No. DE 10 2020 117 317.2, filed on Jul. 1, 2020, the entire disclosure of which is hereby incorporated by reference herein.

FIELD

The invention relates to a sill frame arrangement for a vehicle body arrangement, comprising a battery arrangement provided in the floor region of the vehicle body arrangement, which has at least one frame arrangement consisting of frame longitudinal members and frame cross members which surrounds and supports at least one battery module, the frame longitudinal members resting on sill elements of a sill arrangement, the sill arrangement comprising wall elements which form sill chambers. The invention also relates to a vehicle body arrangement comprising a sill frame arrangement of this type.

BACKGROUND

Sill frame arrangements as part of a vehicle body arrangement are well known from the prior art. It is also known to design sill frame arrangements of this type in such a way that, in the event of an accident, a desired distribution of force into the vehicle body takes place in order to provide the best possible protection of the vehicle occupants against injuries. At the same time, specific vehicle components or engine components must be prevented from being damaged or moved into the vehicle interior and thus potentially injuring vehicle occupants. When motor vehicles are electrified in the form of electric or hybrid motor vehicles, the vehicle body and, in this case in particular the underbody, is used as a support for vehicle batteries. One example of such an arrangement is disclosed by the US patent application US 2013/0088044 A1. In this case, an underfloor battery is provided in the floor region, which comprises a frame arrangement which, in turn, is protected by a sill frame arrangement against a lateral force on the vehicle. In this case, in the region of the battery arrangement, the sill frame arrangement comprises a reinforcing element, which has a special rib structure. Although the stability of the sill frame arrangement in the region of the battery arrangement can be increased thereby, a lateral crash with full deformation of the sill frame arrangement can lead to block formation, as a result of which some portions of the battery arrangement are deformed and thus badly damaged. In addition, the assembly and production of a sill frame arrangement of this type are elaborate and therefore expensive.

SUMMARY

In an embodiment, the present invention provides a sill frame arrangement for a vehicle body arrangement, comprising: a battery arrangement provided in a floor region of the vehicle body arrangement, which has at least one frame arrangement comprising frame longitudinal members and frame cross members which surround and support at least one battery module, the frame longitudinal members resting on sill elements of a sill arrangement, the sill arrangement comprising wall elements which form sill chambers, wherein, over an entire height of the sill arrangement, only one wall element directed toward the frame arrangement is provided, at least one additional sill element being provided on each sill element, the sill element and the at least one additional sill element being integrally bonded and interlockingly connected to one another.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
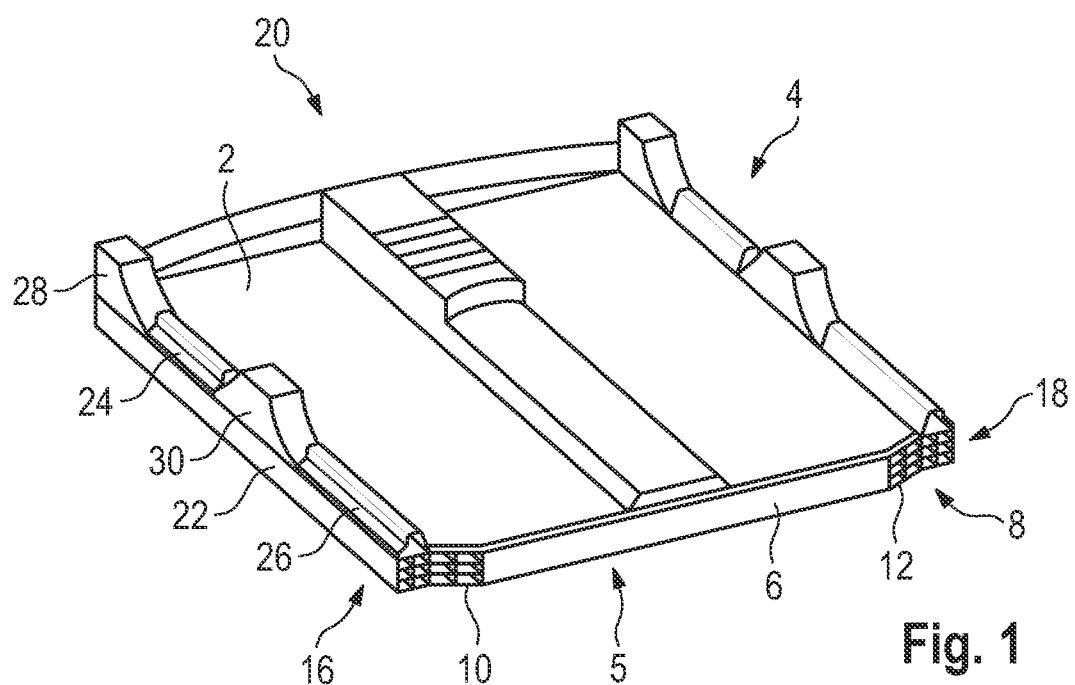
FIG. 1 shows a perspective view of a central floor of a vehicle body arrangement.

In an embodiment, the present invention avoids the above-mentioned disadvantages in a simple and cost-effective manner.

This problem is solved in that, over the entire height of the sill arrangement, only one wall element directed toward the frame arrangement is provided, at least one additional sill element being provided on each sill element, the sill element and the at least one additional sill element being integrally bonded and interlockingly connected to one another. By means of such a configuration according to the invention of the sill arrangement, in the event of a side crash, a uniform deformation takes place from the outside of a vehicle body toward the inside. Significant block formation, which could damage some portions of the battery arrangement, is effectively prevented. In addition, in the event of a side crash, a uniform distribution of thickness is achieved, which leads to an increase in the energy absorption of the sill frame arrangement.

In one advantageous embodiment, pillar bases for the vehicle body arrangement are provided on the sill elements, the additional sill elements each being arranged between two pillar bases. The pillar bases represent a receptacle for the corresponding A-, B and/or C-pillar and, in this region, perform the task of the additional sill elements.

Advantageously, on a side facing away from the frame arrangement, the sill element comprises a first flange element extending in the vertical direction of the vehicle, on which element the additional sill element rests. The additional sill element is thereby interlockingly fixed in a simple manner.

In one particularly advantageous embodiment, the sill element comprises, on a side facing the frame arrangement of the battery arrangement, a second flange element extending in the depth direction of the vehicle. As a result, the battery arrangement is covered in a simple, interlocking manner.

It is also advantageous when the sill arrangement comprises, in the region of the frame arrangement, when viewed in the transverse direction, at least two successive sill chambers to ensure an increase in the energy absorption during the side crash. To ensure an optimum force distribution during the side crash, it is advantageous that at least the wall elements directed toward one another of the respective first sill chambers, which are located on the side of the sill element and of the additional sill element facing away from the frame arrangement, when viewed in the cross-sectional direction, extend at an angle. In order to allow a deformation of the additional sill element to proceed as independently of the deformation of the sill element as possible in the event of a crash, the wall element can be designed to be bent toward the first sill chamber of the additional sill element.

The invention also relates to a vehicle body arrangement comprising a sill frame arrangement of this type, in which the sill arrangement is enclosed in an interlocking manner at least in some regions by body components.

Figure 2:
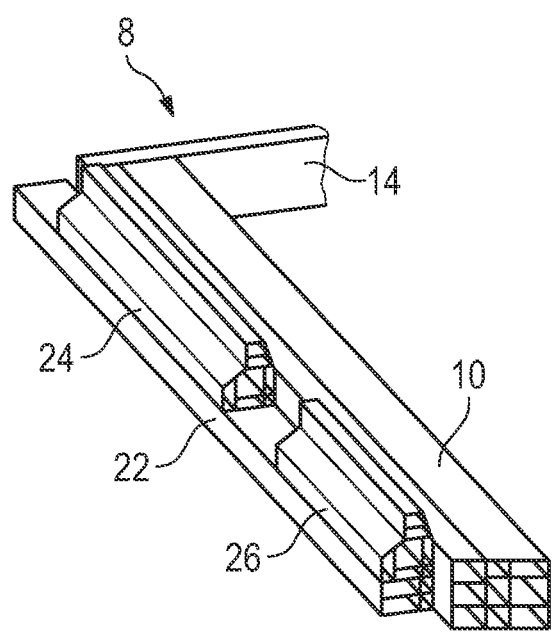
FIG. 2 shows a perspective view of part of a sill frame arrangement comprising a frame arrangement for a battery module.

FIG. 1 is a perspective sectional view of a central floor 2 of a vehicle body arrangement 4. Under the central floor 2, a battery arrangement 5 comprising a battery module 6 in the form of an underfloor battery 6 is provided in a known manner. The battery arrangement 5 comprises a frame arrangement 8 in which the battery module 6 is mounted and which is constructed from frame longitudinal members 10, 12 and frame cross members 14 (a frame cross member is shown in FIG. 2). The frame longitudinal members 10, 12 of the underfloor battery 6 in turn each rest on a sill arrangement 16, 18. The sill arrangement 16, 18 and the frame arrangement 4 together form a sill frame arrangement 20, which is intended to provide the best possible protection of the underfloor battery 6 against deformations and/or displacements in the event of a side crash. As shown separately in the other drawings, in the present exemplary embodiment, a sill arrangement 16, 18 consists of a sill element 22, additional sill elements 24, 26 and pillar bases 28, 30. In the fully assembled state, the sill arrangement is additionally bordered by a sheet metal casing 32 (see FIG. 3).

FIG. 2 shows in detail a sill element 22 with additional sill elements 24, 26 placed thereon, which comes to rest on the frame longitudinal member 10 of the frame arrangement 8. In this view, the pillar bases 28, 30 have been omitted. As FIG. 3 will show more clearly, the additional sill elements 24, 26 are attached to the sill element 22 in an interlocking manner.

Figure 3:
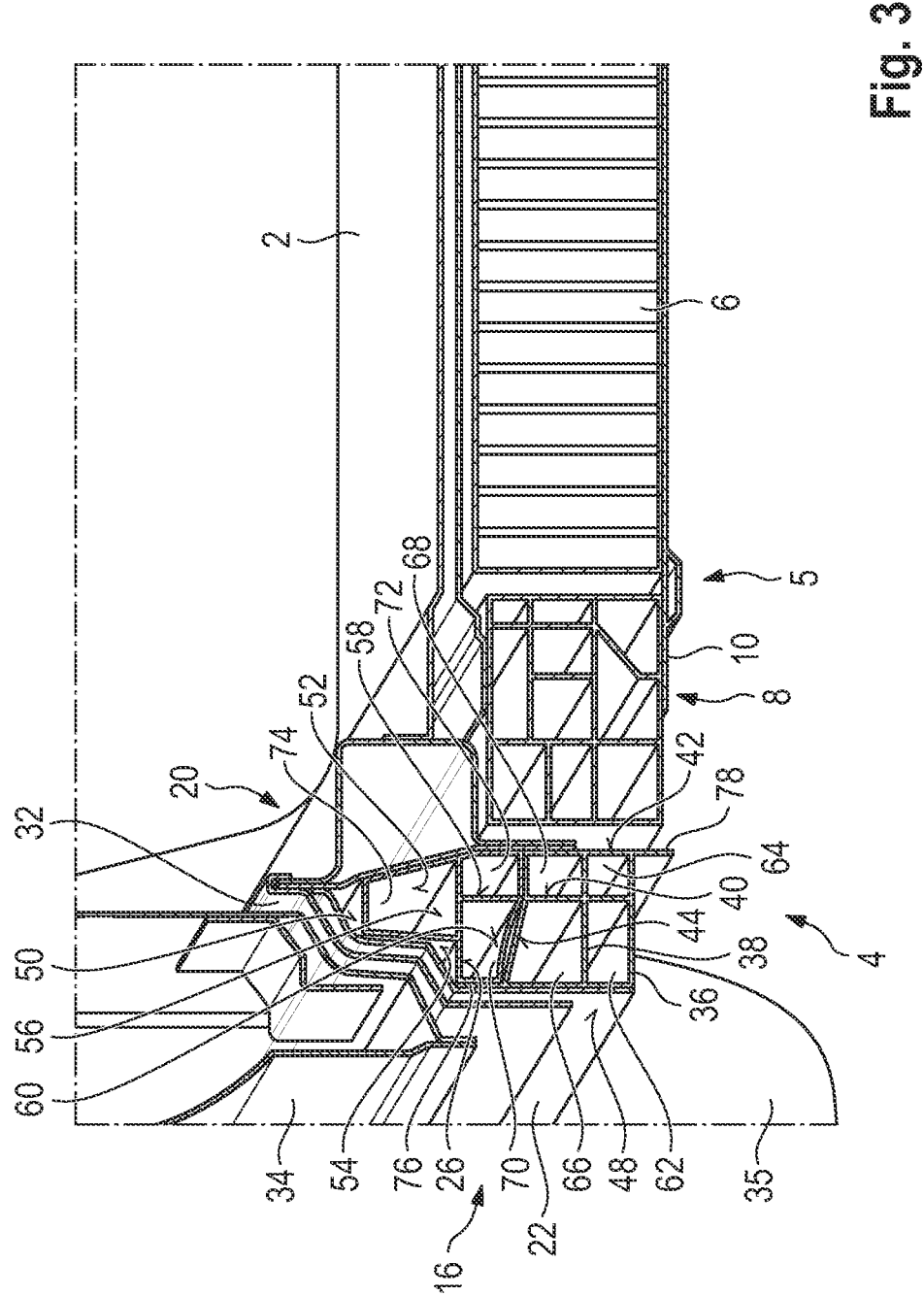
FIG. 3 shows a perspective, sectional view of a vehicle body arrangement in the region of the battery arrangement.

FIG. 3 shows, in a perspective, sectional view, the vehicle body arrangement 4 comprising the battery arrangement 5 provided under the central floor 2. In this case, the battery arrangement 5 is shown by the underfloor battery 6 and a frame longitudinal member 10 of the frame arrangement 8 from FIG. 1. The frame longitudinal member 10 has, in a known manner, a number of ribs or wall elements which reinforce the frame longitudinal member 10. As already described in the context of FIGS. 1 and 2, the frame arrangement 8, together with the sill arrangement 16, forms the sill frame arrangement 20, which is intended in particular to protect the vehicle occupants and the battery module 6 against injuries and damage, respectively.

In this case, in addition to the pillar bases 28, 30 shown in FIG. 1, the sill arrangement 16 consists of the sill element 22 and the additional sill elements 24, 26, of which the additional sill element 26 is shown here. The sill arrangement 16 is bordered by a sheet metal shell arrangement 32. In addition, in the present exemplary embodiment, a vehicle door 34 and a vehicle wheel 35 are also shown. Both the sill element 22 and the additional sill element 26 have wall elements 36, 38, 40, 42, 44 and 48, and 50, 52, 54, 56, 58 and 60, which enclose corresponding sill chambers 62, 64, 66, 68, 70, 72 and 74. In addition, the wall elements 44 and 60 of the sill element 22 and of the additional sill element 26 are oriented at an angle in such a way that the additional sill element 26 acts on the sill element 22 in an interlocking manner. The wall element 60 is also designed to be bent toward the sill chamber 70, as a result of which a deformation, facing away from the wall element 44, of the sill element 60 is ensured in the event of a crash. Furthermore, the sill element 22 and the additional sill element 26 each comprise, in the region of the battery arrangement 5, two successive sill chambers 62, 64, 66, 68, 70, 72 in the transverse direction. In order to provide a complete interlocking fit between the additional sill element 26 and the sill element 22, the sill element 22 has, on a side facing away from the frame arrangement 8, a first flange element 76 extending in the vertical direction of the vehicle, which element rests against the bent wall element 54. In addition, the additional sill element 24 and the sill element 22 are interconnected by a suitable joining technique, such as welding. The sill element 22 additionally comprises, on the side thereof facing the frame arrangement 8, a flange element 78 extending in the depth direction of the vehicle, which element ensures that the underfloor battery 6 is covered in an interlocking manner.

Figure 4A:
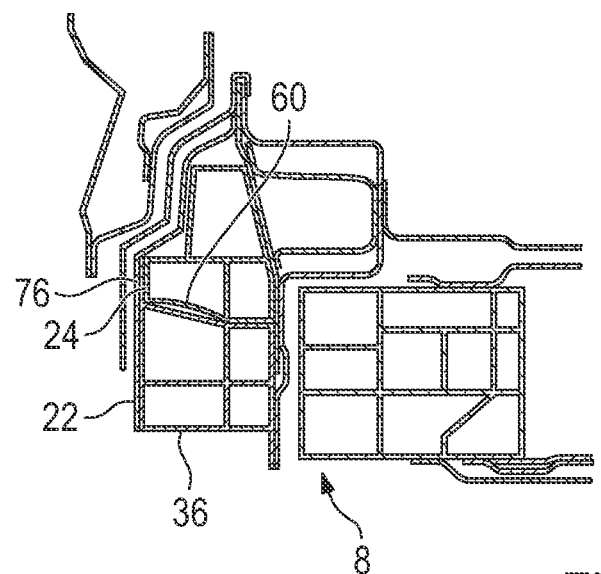
FIG. 4*a*-4*c* show a schematic, sectional view of the vehicle body arrangement from FIG. 3 in a plurality of deformation stages.
Figure 4B:
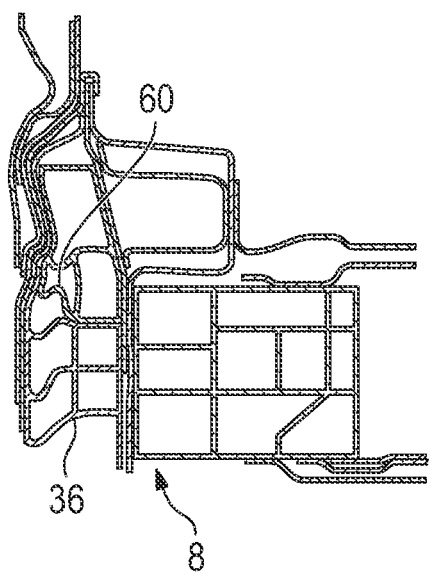
Figure 4C:
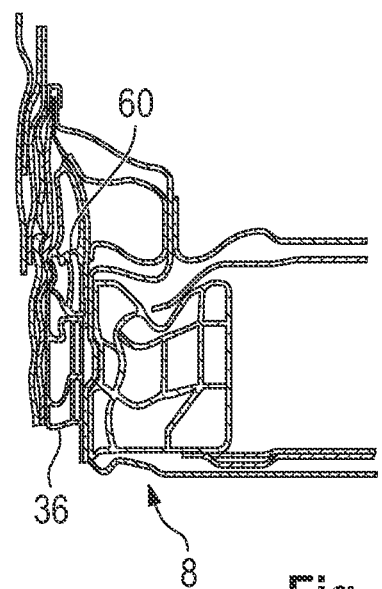

FIGS. 4a to 4c show, in a schematic view, the course of the deformation of the sill element 22, of the additional sill element 24 and of the frame longitudinal member 10. For the sake of clarity, only a few reference signs which are used for orientation have been carried over from FIG. 3. The uniform deformation over the cross section of the sill element 22 and of the additional sill element 24 can clearly be seen. Only a small amount of block formation occurs, which does not put the underfloor battery 6 at risk. The frame longitudinal member 10 is also slightly deformed only toward the end of the course of the deformation in FIG. 4c.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sill frame arrangement for a vehicle body arrangement, comprising:
a battery arrangement provided in a floor region of the vehicle body arrangement, which has at least one frame arrangement comprising frame longitudinal members and frame cross members which surround and support at least one battery module, the frame longitudinal members resting on sill elements of a sill arrangement, the sill arrangement comprising wall elements which form sill chambers,
wherein, over an entire height of the sill arrangement, only one wall element directed toward the frame arrangement is provided, at least one additional sill element being provided on each sill element, the sill element and the at least one additional sill element being integrally bonded and interlockingly connected to one another.

2. The sill frame arrangement of claim 1, wherein pillar bases for the vehicle body arrangement are provided on the sill elements, the additional sill elements each being arranged between two pillar bases.

3. The sill frame arrangement of claim 1, wherein the sill element comprises, on a side facing away from the frame arrangement, a first flange element extending in a vertical direction of the vehicle, on which first flange element the additional sill element rests.

4. The sill frame arrangement of claim 1, wherein the sill element comprises, on a side facing the frame arrangement of the battery arrangement, a second flange element extending in a depth direction of the vehicle.

5. The sill frame arrangement of claim 1, wherein the sill arrangement comprises, in a region of the frame arrangement, when viewed in a transverse direction, at least two successive sill chambers.

6. The sill frame arrangement of claim 1, wherein at least the wall elements directed toward one another of respective first sill chambers, which are located on a side of the sill element and of the additional sill element facing away from the frame arrangement, when viewed in a cross-sectional direction, extend at an angle.

7. The sill frame arrangement of claim 1, wherein the wall element is configured to be bent toward a first sill chamber of the additional sill element.

8. The sill frame arrangement of claim 1, wherein horizontal wall portions of inner sill chambers of the sill element are configured to engage in an opposite chamber of the frame longitudinal member upon deformation.

9. A vehicle body arrangement, comprising:
the sill frame arrangement of claim 1,
wherein the sill arrangement is enclosed in an interlocking manner at least in some regions by body components.

* * * * *